United States Patent Office 3,461,490
Patented Aug. 19, 1969

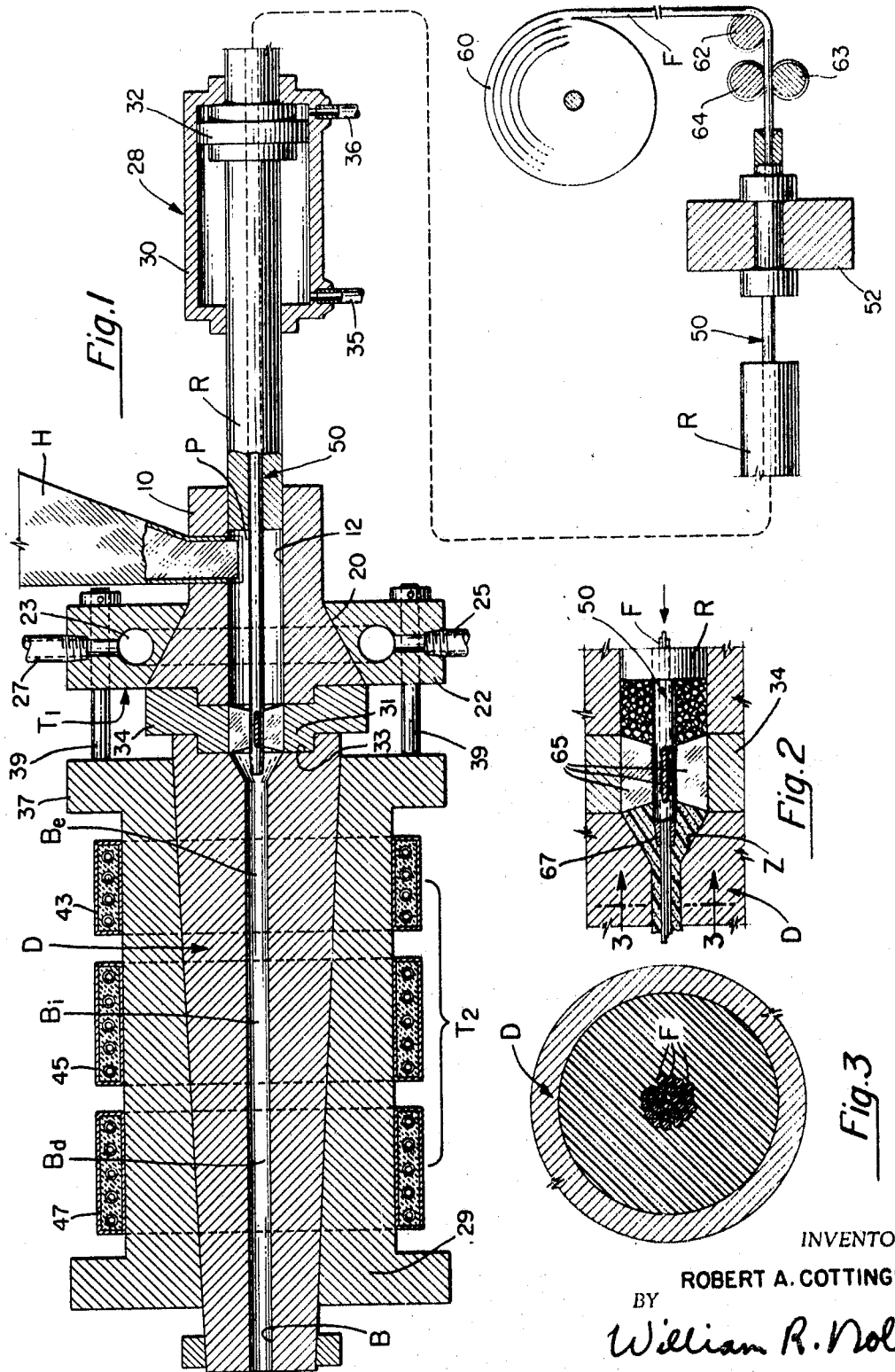

3,461,490
EXTRUDING MOLDING COMPOUNDS
Robert A. Cottingham, York, Pa., assignor to The Budd Company, Philadelphia, Pa., a corporation of Pennsylvania
Filed Jan. 30, 1967, Ser. No. 612,475
Int. Cl. B29f 3/04
U.S. Cl. 18—13                                  4 Claims

ABSTRACT OF THE DISCLOSURE

Apparatus for extruding thermoset material having a longitudinal element therein is provided. The tapered compression chamber for receiving partially polymerized thermosetting material includes a feed opening which is larger in dimensions than the discharge opening. A hollow mandrel prevents the partially polymerized material from contacting the longitudinal element. The thermosetting material polymerizes after it leaves the precompression chamber integrates with the longitudinal element which is drawn into the feed opening by the polymerized material.

---

This invention relates to apparatus for extruding molding compounds and more particularly, to a new and improved apparatus for continuously extruding articles comprising a thermosetting material having a longitudinal element embedded therein.

Apparatus for extruding thermoset, wherein a granular molding compound and an elongated member are advanced through a precompression chamber which is cooled and into die which is surrounded by a heater with variable heat output along its length. A ram forces the compound from the cooled precompression chamber into the heated die where it becomes semifluid and thereafter cure hardens around the member. An elongated mandrel passing through the ram and the precompression enables the longitudinal member to be introduced into the die without coming into contact with molding compound while in the precompression chamber thereby eliminating shear between the compound and the longitudinal element.

In conventional apparatus for extruding a molding compound comprising a resin and at least one modifier such as a plasticizing agent, the molding compound is supplied to a precompression chamber from a supply source such as a hopper. A ram which is mounted for reciprocating movement to the precompression chamber compacts a charge of the molding compound on its advance stroke and advances the compacted charge into the die opening at the entrance end of a die mounted adjacent the precompression chamber. During cycling of the ram, additional charges of molding compound are introduced into the precompression chamber, compacted and advanced to the die to produce a continuous extrusion. A major problem in these prior extruding apparatus is that the extruded article is characterized by voids and weak spots and is not a homogeneous mass throughout due to the fact that the successive charges of the molding compound do not blend together to form a strong bond between the charges during movement through the apparatus.

The present invention solves this problem by providing a new and improved apparatus for extruding characterized by novel features of construction and arrangement and whereby the extruded articles are characterized by a homogeneous mass throughout devoid of pockets or weak spots and which includes an elongated element embedded therein.

With this arrangement, by maintaining a predetermined temperature control in the precompression chamber and a selected temperature gradient along the length of the die for a particular molding compound being extruded, the successive charges of the molding compound advanced through the apparatus are intimately blended and merged together to form an extruded thermoset article characterized by a homogeneous mass devoid of gaps or weak spots.

The various features and details of the construction and operation of apparatus in accordance with the present invention and the details of the continuous extrusion method are hereinafter more fully set forth with reference to the accompanying drawings wherein:

FIG. 1 is a fragmentary longitudinal sectional view of an extrusion apparatus in accordance with the present invention adapted for continuous extrusion of an article comprised of a molding compound and a plurality of elongated filamentary strengthening elements;

FIG. 2 is an enlarged fragmentary sectional view of the juncture of the precompression chamber and die section of the apparatus shown in FIG. 1 and, FIG. 3 is a transverse sectional view of the extruded article taken on line 3—3 of FIG. 2.

Considering now more specifically the details of extrusion apparatus in accordance with the present invention and with reference to the embodiment illustrated in FIG. 1, the apparatus includes a generally cylindrical member 10 having an axial bore 12 of circular cross section extending therethrough defining a precompression chamber P and a die D mounted at the forward end of the member 10 with the bore B of the die in registry with the precompression chamber P. The die bore B is of a predetermined cross section and less than that of chamber P to produce an article of the desired cross-sectional configuration. In the present instance, the bore B is of circular profile to extrude rod-like articles. The member 10 has an outwardly flared conical wall portion 20 on which is seated a ring 22 having an inner conical or tapered face to complement the conical wall portion 20. The ring 22 has a circumferentially extending chamber 23 therein and inlet and outlet conduits 25 and 27, respectively, to facilitate circulation of a fluid through the chamber 23 thereby providing temperature control means $T_1$ for the precompression chamber P. An annular member 34 is disposed between the member 10 and die D having socket in one face to receive an axial projection 31 at the forward end of the member 10 and an axial projection on its other face which seats in a socket 33 in the die. The faces of the sockets and projections make intimate contact one with another to effect good heat transfer therebetween. The elongated die D is supported in the tapered bore of a generally cylindrical holder 29 having a radial flange 37 at one end and is secured adjacent the forward end of the member 10 by a series of bolts 39 extending between the flange 37 and the ring 22.

Temperature control means $T_2$ is also provided for the die D comprising in the present instance a series of three axially spaced, conventional heating units 43, 45 and 47 surrounding the holder 29 having control means (not shown) for providing a selectively adjustable temperature gradient along the length of the die D. The heating units define three die sections along the length of the die, an entrance section $B_e$ adjacent the entrance end of the die, a discharge section $B_d$ adjacent the discharge end of the die and an intermediate section $B_i$ between the sections $B_e$, $B_d$.

Molding compound comprising for example, a resinous material may be supplied to the cooled precompression chamber P from a hopper H and moved through the precompression chamber P and into the bore B of the die D by means of a ram R adapted for reciprocating movement axially in the precompression chamber P by means of a hydraulic actuator or the like 28. The actuator 28 is a conventional type including a cylinder 30, a piston 32 carried by the ram R and actuatable axially of the cylinder 30, and hydraulic lines 35 and 36 for introducing fluid into the chamber to drive the piston 32 and ram R back and forth.

The present embodiment of the invention contemplates the extrusion of a thermoset material having a lingitudinal element or elements in the form of a rod, a hollow cylinder, or a bundle of filaments to comprise a core disposed therein. To this end an elongated hollow tubular mandrel 50 is provided which extends through an axial bore in the ram R and is fixed adjacent one end in the precompression chamber P so that the tip of the mandrel 50 terminates adjacent the forward end of the converging zone Z at the entrance end of the die and at its opposite end the mandrel 50 is supported in a mandrel anchor 52. A bundle of elongated filamentary elements F are fed from a supply spool 60 around a guide roller 62 into the nip of a pair of rolls 63, 64 through the mandrel. The embedment elements F may be suitably preimpregnated by removal of all traces of moisture therefrom and immersed in a liquid solution of a desired thermosetting type material compatible with the type of molding compound which is to form the main body of the extrusion. The forward end of the mandrel 50 mounts a plurality of circumferentially spaced, radially extending web elements or spiders 65 which locate the mandrel centrally of the precompression chamber P so that the tip portion 67 is received within the converging zone Z.

The material surrounding the core contained within sleeve 15 may be of molding compounds of various types, for example, compounds comprising a thermosetting material including phenolics, malamines, epoxies, polyesters, ureas and allyl resins and a suitable modifier and/or lubricant may be extruded in the apparatus. For a selected molding compound, the temperature T, in the precompression chamber P is selectively chosen to maintain the material below its activating point, that is maintain it in a particulate or granular form. The temperature gradient along the length of the die D is selectively chosen to effect conversion of the compacted material to a viscous state as the same enter the conical section Z of the die and into die section designated $B_e$. Activation, corresponding to an exothermic action occurs in the second die section $B_i$, and hardening in the third die section $B_d$. For example, in extruding a thermoset molding compound comprising various percentages of a resin such as phenolic and a modifier such as wood, flour, asbestos and glass, an extruded article characterized by homogeneity and uniform characteristics throughout its length is produced by maintaining the temperature in the precompression chamber P at less than 250° F. and by controlling the temperature of the heating units 43, 45 and 47 to provide a temperature gradient of 250 to 350° F. respectively of the material within the bore. The ram speed may be varied according to the thickness of the profile of the part being formed.

By this arrangement, as the ram R compacts a charge of molding compound in the precompression chamber P on its forward stroke, upon successive cycles of the ram R, the charges of molding compound are advanced successively through the various sections of the die D and blend to form an intergral homogeneous mass, the successive charges resulting in a regular feed or advancement. As the viscous molding compound is moved through the first die section, the preimpregnated filamentary elements F are surrounded by the viscous material. A build-up of heat and pressure occurs to bond and physically interlock the preimpregnated filaments F with the viscous material. The molding pressure is built up in the bore of the die as result of frictional resistance to forward advancement as a result of hardening and curing in sections $B_i$ and $B_d$ of the die. As the hardened cured material is forced from the die it pulls corresponding lengths of filaments F from the supply spool through the hollow mandrel 50 and into the feed throat of the die. It can thus be seen that the article so extruded may be of high yield and impact strength and may have extremely useful application in many areas.

While there has been described what is at present considered to be the preferred embodiment of this invention, it will be obvious to those skilled in the art that various changes and modifications may be made therein without departing from the invention, and it is therefore aimed in the appended claims to cover all such modifications as fall within the true spirit and scope of the invention.

What is claimed is:

1. Apparatus for the continuous production of a thermoset material extrusion having a longitudinal element embedded therein, said apparatus comprising a precompression chamber receiving charges of partially polymerized thermosetting material, connecting with said precompression chamber, a die having a feed opening and a discharge opening, said die including a main elongated portion of the same diameter and a tapered portion leading from said precompression chamber into the elongated portion of said die, said tapered portion tapering from a diameter equal to the diameter of said precompression chamber to a smaller diameter equal to the diameter of said elongated portion of said die, hollow mandrel means coacting with and guiding the longitudinal element into said feed opening, movable ram means having an axial bore and disposed around said mandrel means compacting and moving the said charges from said precompression chamber into said feed opening about said longitudinal element, said hollow mandrel means preventing said partly polymerized material from contacting said longitudinal means within said precompression chamber, said ram means being aligned with said die and disposed to move parallel therewith, and temperature control means generating along said elongated portion of said die a temperature gradient varying from a low temperature value retarding polymerization at said feed opening to a high temperature value ensuring substantial completion of polymerization of said charges at said discharge opening, whereby polymerization of said charges integrates said material and said element and said longitudinal element is drawn into said feed opening at the rate of extrusion from discharge opening.

2. In the aparatus set forth in claim 1 wherein said ram means is reciprocally driven and defines an axial opening therethrough, said mandrel being received in said opening and enabling relative movement of said ram therewith.

3. In the apparatus set forth in claim 1 and including supporting means disposed in said precompression chamber to support one end of said mandrel, and anchor means disposed external of said ram means for supporting the opposite end of said mandrel means to enable feed of said longitudinal element therein.

4. In the apparatus set forth in claim 3 wherein said feed opening of said die defines a convergent wall surface, and wherein said mandrel includes a tip portion received within said feed opening.

References Cited

UNITED STATES PATENTS

| | | |
|---|---|---|
| 1,646,825 | 10/1927 | Kochendorfer. |
| 1,689,584 | 10/1928 | Grupe. |
| 2,511,986 | 6/1950 | Martin. |
| 2,893,056 | 7/1959 | Henning. |
| 2,989,777 | 6/1961 | Bailey. |
| 3,119,148 | 1/1964 | Chambers et al. |
| 3,239,881 | 3/1966 | Larsen. |

WILLIAM J. STEPHENSON, *Primary Examiner*

U.S. Cl. X.R.

18—12